United States Patent
Lake et al.

(10) Patent No.: US 11,080,417 B2
(45) Date of Patent: Aug. 3, 2021

(54) PRIVATE EYE-TO-EYE COMMUNICATIONS WITH WEARABLE HEADS UP DISPLAY

(71) Applicant: Google LLC, Mountain View, CA (US)

(72) Inventors: Stephen Lake, Kitchener (CA); Matthew Bailey, Kitchener (CA); Aaron Grant, Kitchener (CA); Stefan Alexander, Elmira (CA)

(73) Assignee: Google LLC, Mountain View, CA (US)

( * ) Notice: Subject to any disclaimer, the term of this patent is extended or adjusted under 35 U.S.C. 154(b) by 20 days.

(21) Appl. No.: 16/450,152

(22) Filed: Jun. 24, 2019

(65) Prior Publication Data

US 2019/0392163 A1 Dec. 26, 2019

Related U.S. Application Data

(60) Provisional application No. 62/690,286, filed on Jun. 26, 2018.

(51) Int. Cl.
| | |
|---|---|
| *G06F 21/62* | (2013.01) |
| *G06F 3/01* | (2006.01) |
| *G06K 9/00* | (2006.01) |
| *G09G 5/12* | (2006.01) |
| *G06F 3/14* | (2006.01) |
| *G06F 21/60* | (2013.01) |

(Continued)

(52) U.S. Cl.
CPC .......... *G06F 21/6218* (2013.01); *G06F 3/013* (2013.01); *G06F 3/017* (2013.01); *G06F 3/1454* (2013.01); *G06F 21/31* (2013.01); *G06F 21/604* (2013.01); *G06K 9/00617* (2013.01); *G09G 5/12* (2013.01); *H04W 12/08* (2013.01); *H04W 12/63* (2021.01); *G09G 2354/00* (2013.01); *G09G 2358/00* (2013.01)

(58) Field of Classification Search
CPC ...... G06F 21/6218; G06F 3/013; G06F 3/017; G06F 3/1454; G06F 21/31; G06F 21/604; H04W 12/00503; H04W 12/08; G06K 9/00617; G09G 5/12
See application file for complete search history.

(56) References Cited

U.S. PATENT DOCUMENTS

| | | | |
|---|---|---|---|
| 2013/0169560 A1* | 7/2013 | Cederlund | G06F 3/013 345/173 |
| 2014/0198035 A1* | 7/2014 | Bailey | G06F 3/011 345/156 |

(Continued)

*Primary Examiner* — Yonas A Bayou

(57) ABSTRACT

Systems, devices, and methods are disclosed for enabling private communication between head-mounted displays. A first user dons a first head-mounted display. The first head-mounted display authenticates that the first user is authorized to view information displayed by the first head-mounted display. In response to positive authentication, the first head-mounted display displays the information to the first user. The first user inputs a selection command via an input interface, such as, for example, gazing at particular information, to select some of the displayed information. The first head-mounted display generates a message based on the user selection, which may be encrypted by the first head-mounted display prior to transmission. The first head-mounted display transmits the message to a second head-mounted display, such that the second head-mounted display displays the message to an eye of a second user wearing the second head-mounted display.

20 Claims, 6 Drawing Sheets

(51) Int. Cl.
*G06F 21/31* (2013.01)
*H04W 12/00* (2021.01)
*H04W 12/08* (2021.01)
*H04W 12/63* (2021.01)

(56) References Cited

U.S. PATENT DOCUMENTS

| | | | |
|---|---|---|---|
| 2015/0049112 A1* | 2/2015 | Liu | G06T 19/006 |
| | | | 345/633 |
| 2015/0058649 A1* | 2/2015 | Song | G06F 3/013 |
| | | | 713/323 |
| 2015/0186665 A1* | 7/2015 | Herring | G06F 21/6218 |
| | | | 726/30 |
| 2017/0083115 A1* | 3/2017 | Speck | G06T 17/205 |
| 2017/0097753 A1* | 4/2017 | Bailey | G06F 3/013 |
| 2017/0153701 A1* | 6/2017 | Mahon | G02B 27/017 |
| 2017/0205876 A1* | 7/2017 | Vidal | G06F 1/163 |
| 2018/0107835 A1* | 4/2018 | Clement | G07F 17/3211 |
| 2018/0302222 A1* | 10/2018 | Agrawal | G06F 21/604 |
| 2019/0303594 A1* | 10/2019 | Shimakawa | H04L 65/4084 |
| 2019/0340333 A1* | 11/2019 | Srinivasan | G06F 9/547 |

* cited by examiner

PRIVATE EYE-TO-EYE COMMUNICATIONS WITH WEARABLE HEADS UP DISPLAY

TECHNICAL FIELD

The present disclosure generally relates to information communication systems and methods, and particularly, to systems and methods for generating and transmitting private messages for display between head-mounted displays.

BACKGROUND

Description of the Related Art

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other, non-portable electronic systems; however, a small and lightweight electronic device may still be considered portable even if it includes a wire-connection to a non-portable electronic system. For example, earphones may be considered a portable electronic device whether they are operated wirelessly or through a wire-connection.

The convenience afforded by the portability of electronic devices has fostered a huge industry. Smart phones, audio players, laptop computers, tablet computers, and eBook readers are all examples of portable electronic devices. However, the convenience of being able to carry a portable electronic device has also introduced the inconvenience of having the screens of these portable electronic devices become visible to others. For example, one problem with many portable electronic devices is that, since users are generally holding their portable electronic device away from their face, much of the information that is displayed on the portable electronic device can be viewed by other people for whom the information is not destined. This level of intrusion can result in a loss of personal information or a very unpleasant experience for users who are constantly worrying about who is or has been able to see the information on their portable electronic device.

Some solutions of this privacy concern have been in the movement of wearable electronic devices. A wearable electronic device is any portable electronic device that a user can carry without physically grasping, clutching, or otherwise holding on to the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, and the like. Examples of wearable electronic devices include digital wristwatches, electronic armbands, electronic rings, electronic ankle-bracelets or "anklets," head-mounted electronic display units, hearing aids, and so on.

Some types of wearable electronic devices that have the electronic displays described above may include wearable head-mounted displays. A wearable head-mounted display is a head-mounted display that enables the user to see displayed content but does not prevent the user from being able to see their external environment. A typical head-mounted display (e.g., well-suited for virtual reality applications) may be opaque and prevent the user from seeing their external environment, whereas a wearable head-mounted display (e.g., well-suited for augmented reality applications) may enable a user to see both real and virtual/projected content at the same time. A wearable head-mounted display is an electronic device that is worn on a user's head and, when so worn, secures at least one display within a viewable field of at least one of the user's eyes at all times, regardless of the position or orientation of the user's head; but this at least one display is either transparent or at a periphery of the user's field of view so that the user is still able to see their external environment. Examples of wearable head-mounted displays include: Google Glass®, Optinvent Ora®, Epson Moverio®, and Sony Glasstron®.

Interfacing with and controlling such head-mounted displays, however, can be difficult, which can lead to users opting for other, less secure portable electronic devices for communication. Interacting with the content displayed on a wearable head-mounted display remains a technical challenge that must be overcome in order for such displays and communications to become more adoptable by consumers.

BRIEF SUMMARY

A system that enables communication between head-mounted displays may be summarized as including: a first head-mounted display device including: a first display device to display information to at least one eye of a first user when the first head-mounted display device is worn on a head of the first user, wherein the information is discernable to the at least one eye of the first user at a distance and orientation specified for the first user; an input interface to receive a command from the first user; at least one processor communicatively coupled to the first display device and the input interface; at least one non-transitory processor-readable storage medium communicatively coupled to the at least one processor, wherein the at least one non-transitory processor-readable storage medium stores processor-executable instructions that, when executed by the at least one processor, cause the at least one processor to: prior to the first display device displaying the information to the at least one eye of the first user, authenticate that the first user is authorized to view the information; in response to the authentication indicating that the user is authorized to view the information, cause the first display device to display the information to the at least one eye of the first user at the discernable distance and orientation for the user; receive at least one command from the first user via the input interface of the first head-mounted display device to select at least a portion of the information; and in response to receiving the at least one command from the first user, generate a message with the selected portion of the information; and a wireless transmitter communicatively coupled to the first processor to wirelessly transmit the message to a second head-mounted display of the second user.

The first display device may display the information to the at least one eye of the first user by projecting the information onto the at least one eye of the first user. The first display device may display the information to the at least one eye of the first user by projecting the information onto a lens of the first head-mounted display device. The information may include at least one of text, graphics, images, words, phrases, or predefined message. The first head-mounted display device may include an eye-tracker that detects movement of the at least one eye of the first user to detect where on the information the first user is gazing, and wherein the processor-executable instructions stored by the at least one non-transitory processor-readable storage medium, when executed by the at least one processor, may cause the at least one processor to select the portion of the information that is being gazed at by the first user when the at least one command is received from the first user. The wireless transmitter may be communicatively coupled to the first processor to wirelessly transmit the message to the second head-mounted display of the second user via a short-range wireless protocol. The wireless transmitter may be communicatively coupled to the first processor to wirelessly transmit the message to the second head-mounted display of the second user via an intermediary computing device. The processor-executable instructions stored by the at least one non-transitory processor-readable storage medium, when executed by the at least one processor, may cause the at least one processor to: authenticate the first user after the message is generated; and cause the wireless transmitter to transmit the message to the second head-mounted display in response to the first user being authorized to transmit the message. The processor-executable instructions stored by the at least one non-transitory processor-readable storage medium, when executed by the at least one processor, may cause the at least one processor to: cause the first display device to display a virtual keyboard to the at least one eye of the first user; receive at least one virtual key selection command from the first user via the input interface of the first head-mounted display device; generate a passcode to include each virtual key on the virtual keyboard when the first user inputs the at least one virtual selection command; and perform the authentication based on a comparison of the generated passcode and a reference code for the first user. The first head-mounted display device may further include an eye-tracker to detect movement of the at least one eye of the first user, and wherein the processor-executable instructions stored by the at least one non-transitory processor-readable storage medium, when executed by the at least one processor, may cause the at least one processor to: detect a plurality of movements of the at least one eye of the first user via the eye-tracker of the first head-mounted display device; and perform the authentication based on a comparison of the detected plurality of movements and a reference movement pattern for the first user. The processor-executable instructions stored by the at least one non-transitory processor-readable storage medium, when executed by the at least one processor, may cause the at least one processor to: cause the first display device to project infrared light onto the at least one eye of the first user in a scanned pattern; detect eye-scan data based on reflections of the infrared light off the at least one eye of the first user during the scanned pattern; generate test biometric identification data based on the detected eye-scan data; and perform the authentication based on a similarity comparison between the test biometric identification data and reference biometric identification data for the first user. To generate the test biometric identification data the processor-executable instructions, when executed by the at least one processor, may cause the at least one processor to generate a test iris digital representation based on the detected eye-scan data, and wherein the performance of the authentication may include a comparison between the test iris image to a reference iris image of the first user. The first head-mounted display device may further include a proximity sensor to sense a distance between the first head-mounted display device and the head of the first user, and wherein the processor-executable instructions stored by the at least one non-transitory processor-readable storage medium, when executed by the at least one processor, may cause the at least one processor to initiate the authentication in response to the distance between the first head-mounted display device and the head of the first user being below a threshold distance. The input interface may include: a wireless portable interface device with a form factor to be carried by the first user that is physically separate from the first head-mounted display device, wherein the wireless portable interface device may include at least one actuator that, when activated by the first user, causes the wireless portable interface device to wirelessly transmit a signal; and wherein the input interface of the first head-mounted display device may further include a wireless receiver to wirelessly receive signals from the wireless portable interface device as the at least one command from the first user. The input interface may include an actuator on the first head-mounted display device. The input interface may receive the at least one command from a portable electronic device of the first user. The processor-executable instructions stored by the at least one non-transitory processor-readable storage medium, when executed by the at least one processor, may cause the at least one processor to: encrypt the message prior to transmitting the message from the first head-mounted display to the second head-mounted display device.

A method of generating and transmitting private messages between a first user wearing a first head-mounted display and a second user wearing a second head-mounted display may be summarized as including: prior to displaying message information to the first user, authenticating, by the first head-mounted display, that the first user is authorized to view the message information; in response to the authentication indicating that the user is authorized to view the message information, displaying, by the first head-mounted display, the message information to at least one eye of the first user at a discernable distance and orientation for the first user; receiving, by a receiver of the first head-mounted display, at least one input signal from the first user indicative of a user selection action by the first user to select at least a portion of the message information; generating, by the first head-mounted display, the message based on the selected portion of the message information; and transmitting, from the first head-mounted display to a second head-mounted display, the message to be displayed to at least one eye of the second user by the second head-mounted device.

The method may further include: determining, by the first head-mounted display, a gaze position of the at least one eye of the first user based on infrared light that is output from an infrared light source of a scanning laser projector and reflected off the at least one eye of the first user; and determining, by the first head-mounted display each particular displayed information being gazed at by the first user based on the determined gaze position and a mapping between known pixel locations of the scanning laser projector when the at least one input signal is received from the first user. The method may further include: encrypting, by the first head-mounted display, the message prior to transmitting the message from the first head-mounted display to the second head-mounted display; and unencrypting, by the second head-mounted display, the message prior to displaying the message onto the at least one eye of the second user. Transmitting the message to the second head-mounted display may include wirelessly transmitting the message from the first head-mounted display to the second head-mounted display via a short-range wireless communication protocol. Transmitting the message to the second head-mounted display may include wirelessly transmitting the message from the first head-mounted display to the second head-mounted display via a cellular network. Transmitting the message to the second head-mounted display may include wirelessly transmitting the message from the first head-mounted display to a messaging service that forwards the message to the second head-mounted display. Transmitting the message to the second head-mounted display may include wirelessly transmitting the message from the first head-mounted display to a portable electronic device of the first user that forwards the message to the second head-mounted display via a cellular network. Authenticating the first user may include: displaying a virtual keyboard to the at least one eye of the first user; receiving at least one virtual key selection operation from the first user via the receiver of the first head-mounted display device; generating a passcode to include each virtual key on the virtual keyboard selected by the first user; and performing the authentication based on a comparison between the generated passcode and a reference code for the first user. Authenticating the first user may include: detecting, by an eye tracker of the first head-mounted display device, a plurality of movements of the at least one eye of the first user; and performing the authentication based on a comparison between the detected plurality of movements and a reference movement pattern for the first user. Authenticating the first user may include: projecting infrared light onto the at least one eye of the first user in a scanned pattern; detecting eye-scan data based on reflections of the infrared light off the at least one eye of the first user during the scanned pattern; generating test biometric identification data based on the detected eye-scan data; and performing the authentication based on a similarity comparison between the test biometric identification data and reference biometric identification data for the first user. The method may further include authenticating, by the second head-mounted display, that the second user is authorized to access the message on the second head-mounted display; and in response to a positive authentication of the second user, displaying, by the second head-mounted display, the message to at least one eye of the second user.

A system may be summarized as including: a plurality of wireless portable interface devices each with a form factor to be carried by a respective corresponding user, each wireless portable interface device in the plurality of wireless portable interface devices including at least one respective actuator that, when activated by the corresponding user, causes the wireless portable interface device to wirelessly transmit a signal; and a plurality of head-mounted displays, wherein each head-mounted display includes: a display device to display content having a plurality of objects and to display messages received from other head-mounted displays to at least one eye of the corresponding user when the head-mounted display is worn on a head of the corresponding user, wherein the display is discernable to the at least one eye of the corresponding user at a distance and orientation viewable to the corresponding user; a wireless receiver to wirelessly receive signals from the corresponding wireless portable interface device; a processor that: prior to the display device displaying the content to the at least one eye of the corresponding user, authenticates that the corresponding user is authorized to view the content, in response to the authentication indicating that the corresponding user is authorized to view the content, causes the display device to display the content to the at least one eye of the corresponding user, receives at least one signal from the corresponding wireless portable interface device via the wireless receiver, generates a message that includes objects selected by the corresponding user via activation of the at least one actuator to generate the at least one signal, and causes the display device to display messages received from other head-mounted displays to the at least one eye of the corresponding user; and a wireless transceiver communicatively coupled to the processor to wirelessly transmit the message to another one of the plurality of head-mounted displays and to wirelessly receive messages from other head-mounted displays.

The display device may include a scanning laser projector to project an image of the content in a raster pattern onto the at least one eye of the corresponding user. The scanning laser projector may include an infrared light source that projects infrared light onto the at least one eye of the corresponding user; and wherein each head-mounted display in the plurality of head-mounted displays may further include an eye-tracker to detect movement of the at least one eye of the corresponding user based on detection of the infrared light reflecting off the at least one eye of the corresponding user. The processor may further: determine a gaze position of the at least one eye of the corresponding user based on infrared light that is output from an infrared light source of a scanning laser projector and reflected off the at least one eye of the corresponding user, and determine objects being gazed at by the corresponding user based on the determined gaze position and a mapping between known pixel locations of the scanning laser projector when a signal is received from the corresponding wireless portable interface device. The processor may further: prior to the display device displaying the messages received from the other head-mounted display, authenticate that the corresponding user is authorized to view the messages; and in response to the authentication indicating that the user is authorized to view the messages, cause the display device to display messages received from other head-mounted displays to the at least one eye of the corresponding user.

A system that enables communication between head-mounted displays may be summarized as including: a first wireless portable interface device with a form factor to be carried by a first user, the first wireless portable interface device including at least one actuator that, when activated by the first user, causes the first wireless portable interface device to wirelessly transmit a signal; a first head-mounted display device that is physically separate from the first wireless portable interface device, the first head-mounted display device including: a first display device to display message information to at least one eye of the first user when the first head-mounted display device is worn on a head of the first user, wherein the message information is discernable to the at least one eye of the first user at a specified distance and orientation for the first user; a first wireless receiver to wirelessly receive signals from the first wireless portable interface device; a first processor communicatively coupled to the first display device and the first wireless receiver of the first head-mounted display device; a first non-transitory processor-readable storage medium communicatively coupled to the first processor, wherein the first non-transitory processor-readable storage medium stores processor-executable instructions that, when executed by the first processor, cause the first processor to: prior to the first display device displaying the message information to the at least one eye of the first user, authenticate that the first user is authorized to view the information; in response to the authentication indicating that the user is authorized to view the message information, cause the first display device to display the message information to the at least one eye of the first user; receive at least one signal from the first wireless portable interface device via the first wireless receiver; and generate a message that includes message information being displayed by the first display device when the first user activates the at least one actuator to generate the at least one signal; and a first wireless transmitter communicatively coupled to the first processor to wirelessly transmit the message.

The first display device may include a scanning laser projector that projects an image of the message information in a raster pattern onto the at least one eye of the first user. The scanning laser projector may include an infrared light source that projects infrared light onto the at least one eye of the first user; and wherein the first head-mounted display may further include an eye-tracker to detect movement of the at least one eye of the first user based on detection of the infrared light reflecting off the at least one eye of the first user. The first non-transitory processor-readable storage medium may further store processor-executable instructions that, when executed by the first processor, cause the first processor to perform further actions, including: determining a gaze position of the at least one eye of the first user based on infrared light that is output from an infrared light source of a scanning laser projector and reflected off the at least one eye of the first user and detected by the eye-tracker; and determining message information being gazed at by the first user based on the determined gaze position and a mapping between known pixel locations of the scanning laser projector when the signal is received from the first wireless portable interface device. The system may further include: a second head-mounted display device that is physically separate from the first wireless portable interface device and the first head-mounted display device, the second head-mounted display device including: a second wireless receiver to wirelessly receive the message; and a second display device to display the message to at least one eye of a second user when the second head-mounted display device is worn on a head of the second user. The second wireless receiver may receive the message from the first head-mounted display device via a second wireless portable electronic device of the second user. The second head-mounted display device may further include: a second processor communicatively coupled to the second wireless receiver and the second display device; and a second non-transitory processor-readable storage medium communicatively coupled to the second processor, wherein the second non-transitory processor-readable storage medium stores processor-executable instructions that, when executed by the second processor, case the second processor to: authenticate the second user in response to the second user wearing the second head-mounted display device; and in response to a positive authentication of the second user, cause the second display device to display the message to the at least one eye of the second user. The first non-transitory processor-readable storage medium may further store processor-executable instructions that, when executed by the first processor, cause the first processor to encrypt the message prior to the first wireless transmitter transmitting the message; and the second head-mounted display device may further include: a second processor communicatively coupled to the second wireless receiver and the second display device; and a second non-transitory processor-readable storage medium communicatively coupled to the second processor, wherein the second non-transitory processor-readable storage medium stores processor-executable instructions that, when executed by the second processor, cause the second processor to unencrypt the message prior to the second display device displaying the message to the at least one eye of the second user. The first wireless transmitter may transmit the message from the first head-mounted display device to a second head-mounted display device via a short-range wireless communication protocol. The first wireless transmitter may transmit the message from the first head-mounted display device to a second head-mounted display device via cellular network. The first wireless transmitter may transmit the message from the first head-mounted display device to a messaging service that forwards the message to a second head-mounted display device. The first wireless transmitter may transmit the message from the first head-mounted display device to a portable electronic device of the first user that forwards the message to a second head-mounted display device via a cellular network. The first non-transitory processor-readable storage medium may further store processor-executable instructions that, when executed by the first processor, cause the first processor to: cause the first display device to display a virtual keyboard to the at least one eye of the first user; receive at least one virtual key selection operation from the first user via the first wireless portable interface device; generate a passcode to include each virtual key on the virtual keyboard selected by the first user; and authenticate the first user based on a comparison of the generated passcode and a reference code for the first user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with electronic devices, and in particular portable electronic devices such as wearable or smart electronic devices, have not been shown or described in detail to avoid unnecessarily obscuring descriptions of the implementations.

Unless the context requires otherwise, throughout the specification and claims that follow, the word "comprise" and variations thereof, such as, "comprises" and "comprising" are to be construed in an open, inclusive sense, that is, as "including, but not limited to."

Reference throughout this specification to "one implementation" or "an implementation" means that a particular feature, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the implementations.

Figure 1:
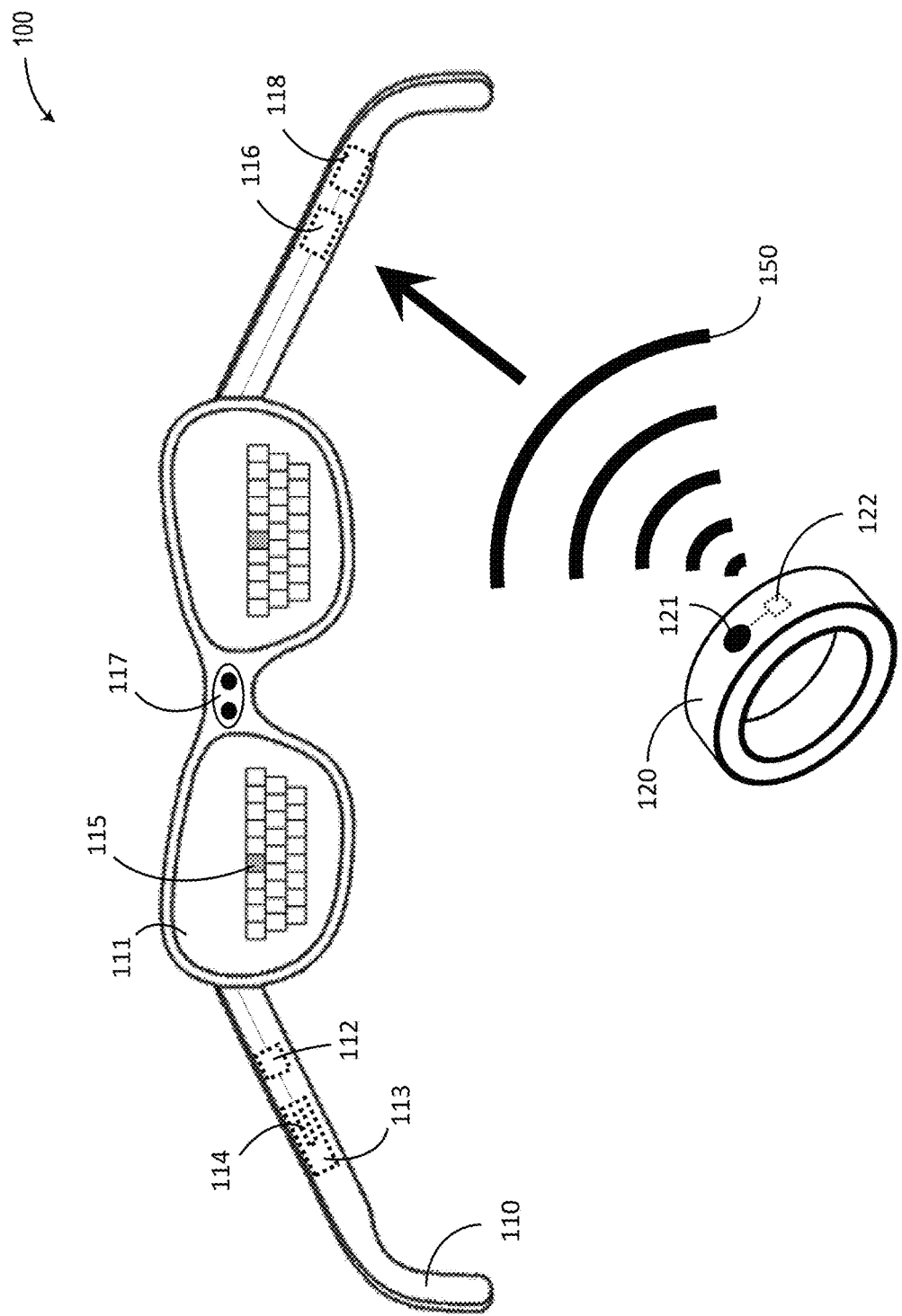
FIG. 1 is an illustrative diagram showing a head-mounted display with information being displayed to a user wearing the head-mounted display for private message generation.
Figure 3:
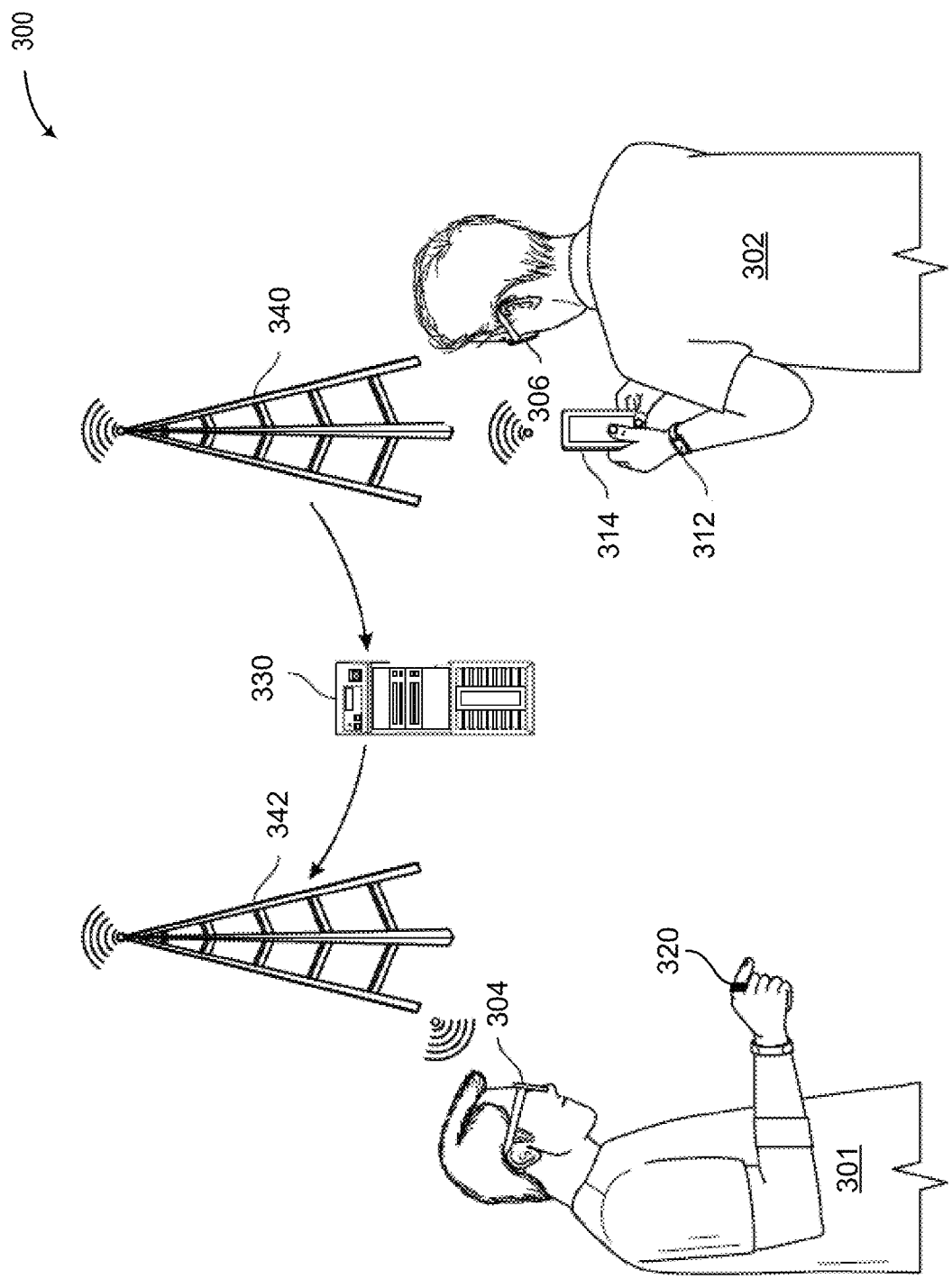
FIG. 3 is an illustrative diagram showing two users employing head-mounted displays to communicate private messages.

FIG. 1 is an illustrative diagram showing a system 100 that enables generation and sharing of private messages displayed on a head-mounted display ("HMD") 110 in accordance with the present systems, devices, and methods. Briefly, a first user of a first HMD 110 is presented information from a display 111 of the HMD 110 for the first user to generate a message, as described herein. The message is sent from the first HMD 110 to a second HMD 110 (not illustrated) of a second user for visual presentation of the message by the second HMD 110 to the second user. For ease of illustration, FIG. 1 only shows a single HMD 110. FIG. 3 described in more detail below, presents one example implementation of two HMDs 110. The message may include a plurality of alphanumeric characters that together forms words, phrases, sentences, and combinations thereof. In some implementations, the message may also include icons, photos, logos, or other graphics.

The HMD 110 includes at least one display 111 (two such displays illustrated in FIG. 1) positioned to display information in the field of view of at least one eye of a user when HMD 110 is worn on the user's head. The display 111 is configured to display the information to at least one eye of the user at a specific distance and orientation to the user wearing the HMD 110. Thus, the display 111 displays the information such that it is in focus to a user wearing the HMD 110 but not visible, in focus, or otherwise discernable to others who are not wearing the HMD 110. One or more display(s) 111 may employ one or more waveguide(s), one or more microdisplay(s), and/or other head-mounted display technologies to display, project, or otherwise present the information to the user. As one example, display 111 may include the hardware and electronics to display content or information 115 to a user, such as, but not limited to, a scanning laser projector that projects an image of the information on the retina of the user's eye.

The information 115 displayed to the user may include one or more alphanumeric characters, symbols, words, phrases, sentences, predefined messages, predefined partial messages, icons, photos, logos, graphics, emojis, emoticons, animations, or other content, or any combination thereof. Accordingly, the message generated by the user to transmit to another HMD for display to another user can include any of the forgoing types or combinations of information.

HMD 110 also includes processor 112 communicatively coupled to the at least one display 111. HMD 110 also includes a non-transitory processor-readable storage medium or memory 113 communicatively coupled to processor 112. Memory 113 stores data and/or computer instructions 114 (i.e., processor-executable instructions) that, when executed by processor 112 of HMD 110, cause the at least one display 111 to display information 115 that is utilized to generate messages responsive to a selection operation or command performed by or received from the user. As described in more detail herein, the computer instructions 114, when executed by the processor 112, authenticate the user prior to displaying the information 115 to the user to determine if the user is authorized to view the information 115 or generate a message on the HMD 110.

HMD 110 also includes an input interface 116 communicatively coupled to processor 112 and operative to receive input commands or signals from the user to select at least a portion of information 115 to generate a message. The input interface 116 may be an actuator (e.g., a button, switch, toggle, lever, dial, or similar component), a proximity sensor or motion detector, a receiver or other input device. For example, an actuator may be attached to or build into the HMD such that the user can activate the actuator to select information 115. As another example, a proximity sensor or motion detector may be utilized to capture or detect physical gestures or movement of the user that is indicative of a user selection command. As yet another example, a receiver (e.g., a wireless receiver, or a wireless transceiver including a wireless receiver) may receive wireless signals 150 from a portable interface device 120 or a portable electronic device (e.g., a smartphone, tablet computer, smartwatch, wearable device, or other computing device) (not shown).

Generally, in response to the selection operation or command performed by or received from the user via input interface 116, a character, icon, symbol, word, or phrase from the displayed information 115 is selected as the message or added to a message. The current or updated message may be displayed to the user by the at least one display 111 of HMD 110. The user can perform one or multiple selection operations to select one or multiple pieces of information. The user can select specific information 111 by manipulating and selecting a visual cursor (e.g., by activating arrow buttons associated with the input interface), looking/gazing at specific information 115 that is being displayed on the display 111 while simultaneously proving a selection command via input interface 116), selecting information as it is changed or scrolled by the display 111, etc.

In the illustrated example of FIG. 1, display 111 displays a representation of a virtual keyboard as the information 115, which a user can use to perform a selection operation by using a virtual cursor or by gazing at a specific key (i.e., letter) of the keyboard and providing a command via input interface 116. The user can continue to perform selection operations to select other keys/letters to generate the message. Thus, system 100 enables the user to type by: i) displaying a virtual keyboard on at least one display 111 and, over a number of instances: ii) enabling the use to select a letter (e.g., by detecting which letter the user is gazing at when the user provides an input command via input interface 116; and iii) generating the message based on the selected information.

Although the forgoing example discusses the use of a virtual keyboard, other implementations may display other types of information. For example, the information 115 may also include predefined words or phrases, predefined messages, or it may include images, icons, photos, emoticons, or the like that the user can select to include in the message. Similarly, the information 115 may also include, in some implementations, dropdowns or other menus that the user can select via input interface 116, which allows the user to select via additional information.

HMD 110 also includes a transmitter 118 (e.g., a wireless transmitter or a wireless transceiver including a wireless transmitter) operative to wirelessly transmit signals to another HMD 110, a smartphone (not shown), or to a cellular network (not shown). Transmitter 118 is communicatively coupled to processor 112. Once the message is generated by HMD 110, as discussed above, the HMD 110 transmits the message to a second HMD 110 (not shown) via transmitter 118. The transmitted message may be a textual or graphical message, such as an SMS (Short Message Service)/MMS (Multimedia Messaging Service); however, the message may also be email, instant messaging, or any other messaging or communication service or protocol. Memory 113 of the receiving HMD 110 stores processor-executable instructions and/or data 114 that, when executed by processor 112 of the receiving HMD 110, cause the at least one display 111 of the receiving HMD 110 to display the received message. A user of the receiving HMD 110 can then interact with the message and generate a response in a manner similar to what is described above with respect to generating a message. In this way, HMD 110 can transmit messages to other HMD 100 and receive and display messages received from other HMD 110.

A person of skill in the art will appreciate, however, that while the processor 112 and memory 113 of the HMD 110 are illustrated as being built into or attached to the HMD 110 in one implementation, in other implementations of the present systems and method, processor 112 and/or memory 113 may be the processor and/or memory of other electronic devices, such as a smart phone (not shown), a tablet computer (not shown), a laptop computer (not shown), a smart watch (not shown), a fitness tracker device (not shown), and the like. In at least one such implementation, the other electronic device may perform the functionality described herein as the processor 112 and memory 113, and further be in communication with the HMD 110 to transmit information to the HMD 110 (e.g., messages from other HMDs, information to be displayed, etc.) and receive information from the HMD 110 (e.g., a generated message, eye tracking information, etc.).

In some implementations, HMD 110 further includes an eye-tracker 117 that is operative to detect the eye position and/or gaze direction of at least one eye of the user and is communicatively coupled to processor 112. Eye-tracker 117 includes at least one camera or photodetector to measure light (e.g., visible light or infrared light) reflected from the at least one eye, and processor 112 may determine the eye position or gaze direction of the at least one eye based on the measured reflections with respect to the content or information being displayed to the user. In some implementations, display 111 includes a scanning laser projector as the light engine to project a visible image onto the user's eye. The display 111 can also include an infrared diode that is used to project infrared light onto the user's eye, which can be measured by eye-tracker 117. Because a scanning laser projector is used as the light engine of the light measured by eye-tracker 117, each pixel in the raster scan pattern of the scanning laser projector of display 111 can be mapped to a corresponding measurement by eye-tracker 117. As a result, processor 112 can reproduce a full IR-image of the user's eye from the measurements by eye-tracker 117 during a complete raster scan of display 111. In some implementations, eye-tracker 117 is operative to detect that the user is gazing at (e.g., looking, staring or generally pointing his or her eye(s) in the direction of) a particular portion, alphanumeric character, symbol, object, etc. in the information 115 displayed by the at least one display 111, which can be used to authenticate the user or to generate the message. In the illustrated example of FIG. 1, eye-tracker 117 is carried by HMD 110, though in alternative implementations eye-tracker 117 may be physically separate from HMD 110.

In various implementations, the measurements by eye-tracker 117 may be used to authenticate the user wearing the HMD 110. For example, processor 112 may receive eye scan data via eye-tracker 117, from which images of an eye, or of a portion thereof, can be reconstructed (e.g., constructed for the first time from multiple samples). In one example, the eye scan data includes reflections of infrared light detected from the eye by eye-tracker 117 and scan orientations of display 111 (e.g., an optical scanner of a scanning laser projector) corresponding to the detected reflections. Processor 112 may receive sync mirror signals, which control scan orientation of display 111. Alternatively, processor 112 may receive images of the eye from another application or circuitry that takes the eye scan data and reconstructs the images of the eye from the eye scan data. In other implementations, processor 112 may receive iris recognition data from an external iris recognition system.

As one implementation example of such authentication, the received display data may be written into a frame buffer, which may be transmitted to a controller that controls the display 111 to modulate the infrared and visible laser diodes according to the display data. The display 111 applies driving voltages to scan mirror(s) of an optical scanner so that the laser beam provided by the laser module lands on the correct spot in the display space. For the purpose of capturing an image of the eye, the "display data" may have an infrared component that will not be visible to the eye.

Before a user can be authenticated on a wearable heads-up display, the user has to be enrolled as a registered user on the wearable heads-up display. The enrollment process may generally include capturing or constructing at least one image of at least a portion of an eye of a subject user. The enrollment process further includes extracting biometric identification data from the at least one image of at least a portion of an eye of the subject user ("reference biometric identification data"), and storing, or otherwise associating, the reference biometric identification data with the wearable heads-up display. In one example, the reference biometric identification data includes at least one iris image of the subject user ("reference iris image") isolated from the at least one image of at least one eye of the subject user and/or an iris template derived from the at least one reference iris image ("reference iris template"). An "iris template" is a digital representation of the unique features that have been extracted from an iris image. In some examples herein, the reference biometric identification data may further include one or more auxiliary eye features, such as eyelash pattern, eyelid shape, occlusion of the iris based on upper and/or lower eyelids ("eyelid occlusion pattern"), and pupillary iris boundary shape. This may enable a multi-factor authentication method based on iris pattern and at least one auxiliary eye feature.

During authentication, at least one image of at least one eye of a subject user wearing the wearable heads-up display is captured or constructed. The authentication process includes extracting biometric identification data from the at least one image of at least one eye of the subject user ("test biometric identification data"). In one example, the test biometric identification data includes at least one iris image of the subject user ("test iris image") and/or an iris template derived from the at least one test iris image ("test iris template"). The authentication process includes determining a similarity measure between the test biometric identification data and the reference biometric identification data associated with the wearable heads-up display and making a decision based on the similarity measure. The similarity measure is the measure of how much alike two data objects are. The similarity measure may be expressed in terms of a value of similarity or in terms of a probability of similarity. The similarity measure may be determined between test and reference iris templates or between test and reference iris images. If the biometric identification data are enhanced to include one or more auxiliary eye features, similarity between auxiliary eye feature(s) of the test iris template and auxiliary eye feature(s) of the reference iris template may be considered as well in validating the identity of the user.

Eye or biometric identification is one technology that may be used to authenticate the user before displaying information 115 to the user or before enabling the user to generate a message. Other types of user authentication may also be utilized, such as but not limited to passcodes, fingerprints, voice recognition, etc.

Display(s) 111 may employ any or all of the display technologies and eye-tracker 117 may employ any or all of the eye-tracker technologies described in US Patent Application Publication 2015-0205134; U.S. Non-Provisional patent application Ser. No. 14/749,341 (now US Patent Application Publication 2015-0378164); U.S. Non-Provisional patent application Ser. No. 14/749,351 (now US Patent Application Publication 2015-0378161); U.S. Non-Provisional patent application Ser. No. 14/749,359 (now US Patent Application Publication 2015-0378162); U.S. Provisional Patent Application Ser. No. 62/117,316; U.S. Provisional Patent Application Ser. No. 62/134,347 (now US Patent Application Publication 2016-0274365); U.S. Provisional Patent Application Ser. No. 62/156,736 (now US Non-Provisional patent application Ser. Nos. 15/145,576, 15/145,609, and 15/145,583); U.S. Provisional Patent Application Ser. No. 62/167,767 (now US Non-Provisional patent application Ser. No. 15/167,458 and 15/167,472); U.S. patent application Ser. No. 15/282,535 (now US Patent Application Publication 2017-0097753); U.S. Provisional Patent Application 62/428,320 (now U.S. Non-Provisional patent application Ser. No. 15/827,675 and 15/827,667; U.S. Provisional Patent Application 62/632,785; U.S. Provisional Patent Application 62/658,431; U.S. Provisional Patent Application 62/658,434; and/or U.S. Provisional Patent Application 62/658,436. One illustrative implementation of such eye tracking is briefly described below in conjunction with FIG. 4. Similarly, processor 112 may employ one or more authentication technologies, such as, but not limited to, those technologies described in U.S. Provisional Patent Application Ser. No. 62/680,969, which is herein incorporated by reference.

In some implementations, such as where eye-tracker 117 is utilized, system 100 provides a multi-modal interface for interacting with information 115 displayed to the user by the HMD 110. For example, a first mode of interaction (i.e., via eye position and/or gaze direction) is realized by eye-tracker 117. For a second mode of interaction, system 100 further receives selection commands from the user via input interface 116.

As mentioned above, the input interface 116 may include an actuator, a proximity sensor or motion detector, a receiver, or other input device. In the example, where the input interface 116 is a receiver, the user selection commands may be received from a wireless portable interface device 120 that has a form factor to be carried by or on the user. For example, in the illustrated example of FIG. 1, portable interface device 120 has the general size and geometry of a ring to be worn on a finger or thumb of the user. In other implementations, portable interface device 120 may be a wristband or an armband, or may adopt a non-annular form factor that clips, sticks, or otherwise attaches to the user or the user's clothing (e.g., a pen with a clip), or it may be embedded in the user's clothing (e.g., in the user's shoe or shirt).

Portable interface device 120 is physically separate from HMD 110 and includes at least one actuator 121 (e.g., a button, switch, toggle, lever, dial, or similar component) that, when activated by the user, causes portable interface device 120 to wirelessly transmit a signal 150 from a transmitter 122 (e.g., a wireless signal generator) to input interface 116 on HMD 110. In the illustrated example of FIG. 1, actuator 121 may provide a "select" function in combination with whatever the user is gazing at on at least one display 111 of HMD 110 as detected by eye-tracker 117 and determined by processor 112. Other implementations of portable interface device 120 may include a second and even a third actuator to perform additional user actions (e.g., scrolling, deleting, swiping, etc.), but in general, portable interface device 120 includes very few actuators in order to minimize its form factor.

Portable interface device 120 is a wireless device (i.e., communicates with the HMD 110 without wires), but may be wired in some implementations. For example, in some implementations, portable interface device 120 may be configured to transmit more conventional wireless signals, such as short-wavelength radio wave signals and protocols, such as, without limitation: Bluetooth®, Bluetooth® Low-Energy, Bluetooth Smart®, ZigBee®, Wi-Fi®, Near-Field Communication (NFC), or the like. In other implementations, portable interface device 120 may be configured to transmit radio or microware signals in response to activation of a piezoelectric element communicatively coupled to actuator 121 and transmitter 122 (e.g., a radio frequency antenna) communicatively coupled to the piezoelectric element. In yet other implementations, portable interface device 120 may include a mechanical resonator as transmitter 122 physically coupled to actuator 121. When activated (e.g., pressed, pushed, depressed, switched, or similar) by the user, actuator 121 mechanically actuates (e.g., strikes, impacts, oscillates, vibrates, or similar) mechanical resonator, which generates a sonic, acoustic, or aural signal. In this configuration, input interface 116 of HMD 110 includes a microphone and/or a piezoelectric element that may be tuned to be responsive to sonic signals in the range of sonic signal wirelessly transmitted by mechanical resonator of portable interface device 120.

Thus, in the present systems, devices, and methods, a signal 150 that is "wirelessly transmitted" may exist in a variety of different forms, including, without limitation: a radio frequency signal, a sonic signal (such as an ultrasonic signal), an optical signal (generated by a mechanoluminescent material, such as a piezoluminescent alkali halide or a triboluminescent mineral), a photonic signal, a thermal signal, and so on.

In some implementations, the functionality of the portable interface device 120 may be included in a smart phone (not shown), such as via an application running on the smart phone and the user activating the increase volume button, or other button (whether physical or visual on a touch screen) on the smart phone, on the HMD 110 itself, or in some other computing device.

Wearable electronic devices are typically larger and bulkier than other wearable accessories, such as traditional jewelry. This is at least in part because the form factor of wearable electronic devices typically must accommodate large and bulky components, such as an on-board battery, that are required for the wearable electronic device to operate. In the present systems, devices and methods, portable interface device 120 is wireless (and in some implementations batteryless) in order to remove the large and bulky electric components and provide a small and compact form factor not typically seen among wearable electronic devices, such that the portable interface device 120 approximates the form factor of traditional jewelry or other accessories.

As previously described, memory 113 of HMD 110 stores processor-executable instructions and/or data 114 that, when executed by processor 112 of HMD 110, cause the at least one display 111 to display information 115 and generate a message responsive to a selection operation or command performed by or received from the user. In some implementations, the selection operation may comprise a substantially concurrent combination of gazing at specific information 115 displayed by the at least one display 111 (e.g., as detected by eye-tracker 117) and activating the at least one actuator 121 of the portable interface device 120 (or otherwise providing a selection command via input interface 116).

For example, the selection operation may be effected by HMD 110 (e.g., by processor 112 of HMD 110) in response to receipt of a wireless "selection signal" 150 at input interface 116 transmitted from transmitter 122 of portable interface device 120, and the selection operation may include "selecting" whatever particular information 115 is on display 111 or that eye-tracker 117 identifies the user is looking/gazing at when the wireless selection signal 150 is received at input interface 116. To this end, when input interface 116 of HMD 110 receives a wireless signal 150 from portable interface device 120, processor 112 executes processor-executable instructions and/or data 114 stored in memory 113, which cause processor 112 to: i) request current gaze direction data from eye-tracker 117; ii) identify particular information 115 at which the user is gazing (e.g., a particular alphanumeric character, icon, emoji, emoticon, pre-generated words or phrase, etc.) based on the current gaze direction data received from eye-tracker 117 (e.g., the particular information identified among information displayed by at least one display 111); iii) generate or modify a message to include the selected information; and iv) cause at least one display 111 to display the current message to the user.

In some implementations, portable interface device 120 may be utilized without eye-tracker 117, such by a user activating one or more actuators 121 on portable interface device 120 to generate a signal 150 that, when received by the input interface 116, controls the movement of a virtual cursor displayed to the user. Although eye-tracker 117 and portable interface device 120 are being illustrated as some example implementations of a user providing a selection operation or command, the present systems and methods may employ other types of information selection techniques and technologies.

Figure 2:
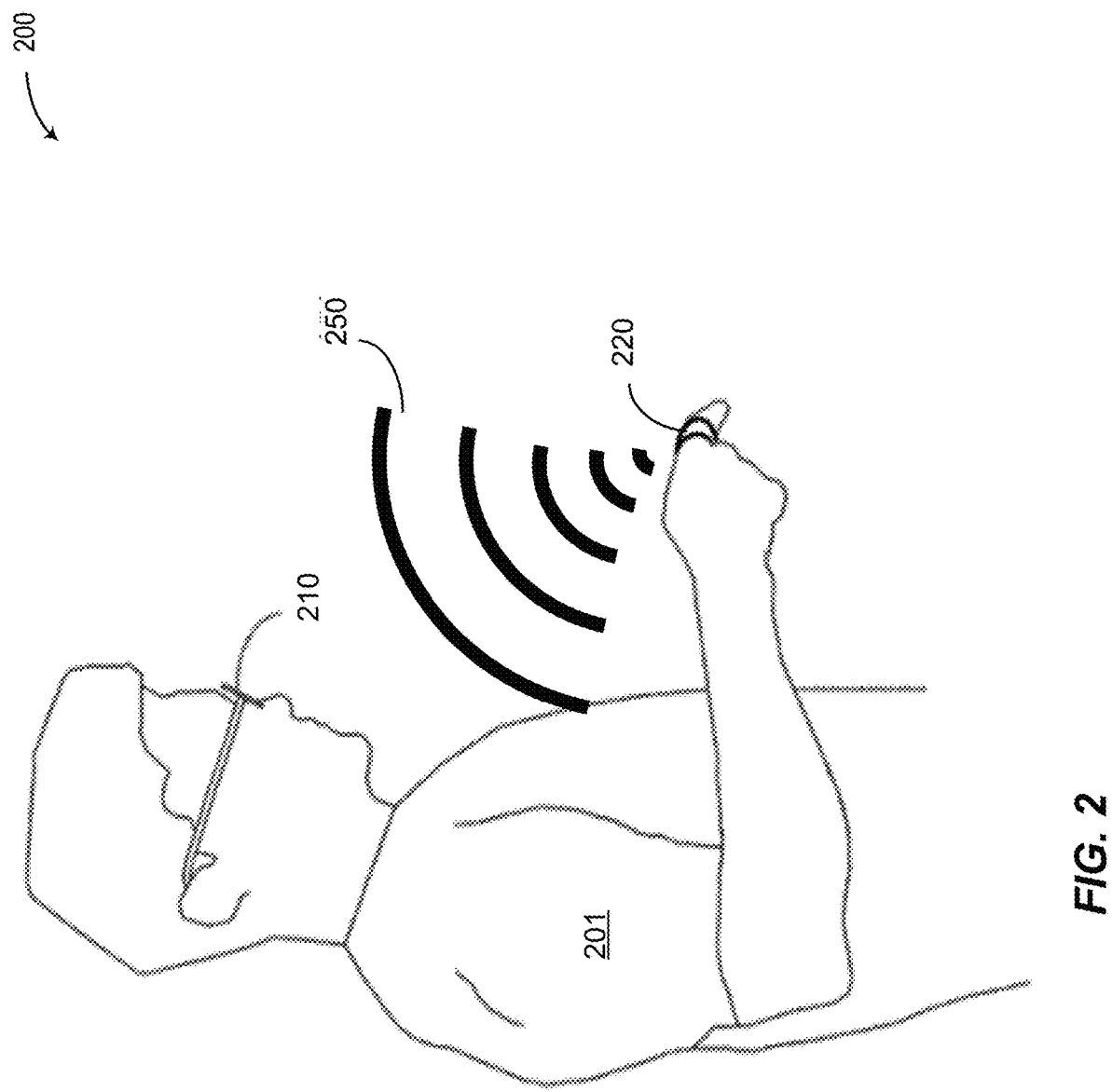
FIG. 2 is an illustrative diagram showing an example portable electronic interface in which a user wears that enables the user to interact with displayed content on the head-mounted display to generate a private message.

FIG. 2 is an illustrative diagram showing an example human-electronics interface 200 in which a user 201 wears a system that enables the user to interact with displayed content in accordance with the present systems, devices, and methods. The system comprises a HMD 210 and a portable interface device 220. HMD 210 is substantially similar to HMD 110 from FIG. 1, and portable interface device 220 is substantially similar to portable interface device 120 from FIG. 1. As mentioned above, selection commands from a user can be provided by numerous different mechanisms, the human-electronics interface 200 being just one, and thus the human-electronics interface 200 is being provided as one such example.

In FIG. 2, portable interface device 220 is shown having the form factor of a ring and worn on a finger of user 201; however, in alternative implementations portable interface device 220 may adopt a different form factor and be worn elsewhere on/by user 201, such as a wristband, an armband, or a device that clips, affixes, built-in, or otherwise couples to user 201 or to an article of clothing worn by user 201. In general, it is advantageous for the actuator (121 in FIG. 1, not visible in FIG. 2) of portable interface device 220 to be easily and inconspicuously accessible to user 201. In the case of a ring worn on the index finger of user 201, an actuator on portable interface device 220 may be easily and inconspicuously activated by the adjacent thumb of user 201. As previously described, activation of the actuator causes portable interface device 220 to wirelessly transmit a signal 250 (e.g., a radio frequency signal, a sonic signal such as an ultrasonic signal, an optical or photonic signal, or similar), and HMD 210 includes a receiver that wirelessly receives signal 250. If signal 250 is received by HMD 210 while an eye-tracker on HMD 210 detects that user 201 is gazing at particular information displayed on HMD 210 that is responsive to a selection operation, then the combination of user 201 gazing at the information displayed by HMD 210 and substantially concurrently activating the actuator of portable interface device 220 effects the selection operation. In response to the selection operation, HMD 210 may generate or update a message being composed by user 201.

Referring now to FIG. 3, a system 300 for communicating private messages between a first user 301 and a second user 302 via a first head-mounted display 304 and a second head-mounted display 306, respectively, is shown. The first user 301 has a first head-mounted display 304 (e.g., a pair of smart glasses) as well as portable interface device 320. The second user 302 has a second head-mounted display 306 (e.g., another pair of smart glasses) as well as a smart watch 312 and a smart phone 314 (which may include functionality similar to portable interface device 120 in FIG. 1. The first head-mounted display 304 and its components, as well as the second head-mounted display 306 and its components, function in the same manner as the HMD 110 in FIG. 1. Similarly, the portable interface device 320 and its components function in the same manner as the portable interface device 120 in FIG. 1.

In some aspects of various implementations, the first head-mounted display 304 and the second head-mounted display 306 communicate wirelessly with one another via a short-range wireless communication protocol, including without limitation: Bluetooth®, Bluetooth® Low-Energy, Bluetooth Smart®, ZigBee®, Wi-Fi®, Near-Field Communication (NFC), or the like. In some aspects of other implementations, such as shown in FIG. 3, the first head-mounted display 304 of the first user 301 and the second head-mounted display 306 of the second user 302 communicate via one or more intermediary processor-based devices. For example, the first head-mounted display 304 and the second head-mounted display 306 may communicate with an intermediary messaging service device 330 (e.g., a server) via cellular communication towers 342 and 340.

In another aspect of some implementations, the second head-mounted display 304 of the second user 302 may communicate with the intermediary messaging service device 330 (or the other head-mounted display device) via smart phone 314 or smart watch 312 (or other processor-based device) that communicates with the cellular communication tower 340 (or other head-mounted display). Although not illustrated, the first head-mounted display 304 of the first user 301 may also communicate with the intermediary messaging service device 330 via a smart phone (not shown) or other processor-based device. Other wired or wireless communication networks may be utilized to facilitate communication and message transmission between the first head-mounted display 304 of the first user 301 and the second head-mounted display 306 of the second user 302. For example, other local area networks, wide area networks, satellite networks, cable networks, IEEE 802.11 networks, Bluetooth networks, and the like may be employed.

Figure 4:
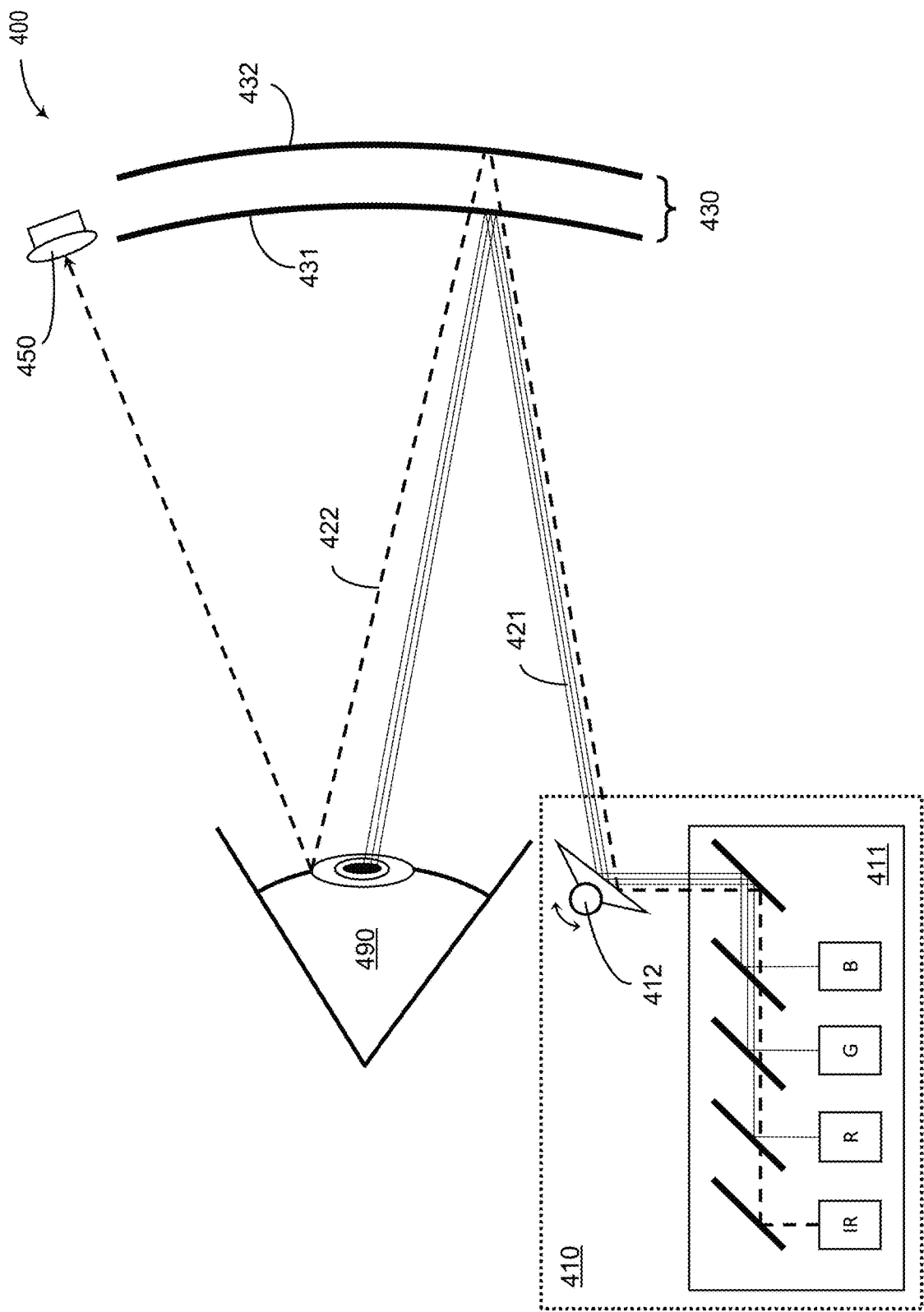
FIG. 4 is an illustrative diagram showing additional details of an implementation of a head-mounted display that includes a scanning laser projector that has been adapted to integrate laser eye tracking functionality.

FIG. 4 is an illustrative diagram showing a portion of a wearable head-mounted display 400 that includes a scanning laser projector 410 that has been adapted to integrate laser eye tracking functionality. Such functionality is described in accordance with the above-mentioned US Patent Applications and Publications. Other types of laser projector and eye tracking technology may also be employed, but the following provides one example implementation of such technology for displaying information onto a user's eye while simultaneously tracking the user's gaze in accordance with the present systems, devices, and methods. Similarly, other non-projector technologies may be utilized to display the information to the user wearing HMD 400 such that it is discernable to that user but not others who are not wearing HMD 400. The head-mounted display 400 and its components function in the same manner as the HMD 110 in FIG. 1.

Scanning laser projector 410 comprises a laser module 411 that includes a red laser diode (labelled "R" in FIG. 4), a green laser diode (labelled "G" in FIG. 4), and a blue laser diode (labelled "B" in FIG. 4) and a scan mirror 412. Only one scan mirror 412 is illustrated to minimize clutter but alternative implementations may employ two or more scan mirrors. In addition, laser module 411 also includes an infrared laser diode (labelled "IR" in FIG. 4) for use in laser eye tracking. Scan mirror 412 simultaneously serves as both the scan mirror for laser projection (i.e., for projecting display content) and the scan mirror for laser eye tracking. Scan mirror 412 is used herein as a general example of a mechanism for scanning laser light over an area, while a person of skill in the art will appreciate that other mechanisms, just as oscillating or cantilevered fiber optics, may be employed to similar effect.

Scan mirror 412 may advantageously include one or multiple (e.g., in a DLP configuration) digital microelectromechanical systems ("MEMS") mirror(s). In typical operation, the scan mirror 412 of a scanning laser projector 410 repeatedly scans over its entire range of positions and effectively scans over the entire field of view of the display. Whether or not an image/pixel is projected at each scan position depends on controlled modulation of the laser module 411 and its synchronization with the scan mirror 412. The fact that the scan mirror 412 generally scans over its entire range during operation as a laser projector makes the scan mirror 412 of a scanning laser projector 410 compatible with use for eye tracking purposes. Thus, scanning laser projector 410 is adapted to provide eye tracking functionality without having to compromise or modify its operation as a scanning laser projector.

In operation, scan mirror 412 repeatedly scans over its entire range of positions while the RGB laser diodes are modulated to provide the visible light 421 (drawn in solid lines in FIG. 4) corresponding to pixels of a scanned image. At the same time, the infrared laser diode may be used to illuminate the user's eye 490 with infrared laser light 422 (drawn in dashed lines in FIG. 4) for eye tracking purposes. Thus, as scan mirror 412 scans modulated R, G, and/or B light 421 over eye 490 to produce display content or information based on modulation of the R, G, and/or B laser diodes, scan mirror 412 also scans infrared laser light 422 over eye 490 based on modulation of the IR laser diode. Depending on the implementation, the infrared laser diode may simply be on at all times to scan over the entire area of eye 490 with infrared laser light 422, or the infrared laser diode may be modulated to provide an illumination pattern (e.g., a grid, a set of parallel lines, or any other shape/pattern) on eye 490. Because infrared laser light 422 is invisible to the eye 490 of the user, infrared laser light 422 does not interfere with the scanned image being projected by scanning laser projector 410.

In order to detect infrared laser light 422 that reflects from eye 490, wearable head-mounted display 400 includes at least one infrared photodetector 450. While only one photodetector 450 is depicted in FIG. 4, in alternative implementations any number of photodetectors 450 may be used (e.g., an array of photodetectors 450, or a charge-coupled device based camera that is responsive to light in the infrared wavelength range). The term "photodetector" is used generally herein to refer to a device that is sensitive and responsive to light (i.e., infrared light in the case of an infrared photodetector) and provides signals in response to sensing or detecting such light. Photodetector 450 detects an intensity pattern or map of reflected infrared laser light 422 that depends on the position/orientation of eye 490. That is, each distinct orientation of scan mirror 412 may result in a respective intensity of infrared laser light 422 being detected by photodetector 450 that depends on the position/orientation of eye 490 (or the position/orientation of feature(s) of eye 490, such as the cornea, iris, pupil, and so on). The intensity pattern/map detected by photodetector 450 depends on where eye 490 is looking. In this way, the same scanning laser projector 410 in head-mounted display 400 enables both i) image projection, and ii) the gaze direction and movements of eye 490 to be measured and tracked.

Another adaptation to wearable head-mounted display 400 for the purpose of integrating eye tracking functionality into scanning laser projector 410 is wavelength-multiplexing of holographic optical element 430 (also referred to as a holographic combiner). Wearable head-mounted display 400 includes a holographic optical element 430 that redirects laser light output from the laser module 411 of scanning laser projector 410 towards eye 490; however, in wearable head-mounted display 400, holographic optical element 430 has been adapted to include at least two wavelength-multiplexed holograms: at least a first hologram 431 that is reflective of the visible light 421 output by laser module 411 and transmissive of the infrared light 422 output by laser module 411, and a second hologram 432 that is reflective of the infrared light 422 output by laser module 411 and transmissive of the visible light 421 output by laser module 411. For the purposes of the present systems, devices, and methods, the term "reflection" and variants such as "reflective" are used for the sake of simplicity and brevity to describe light redirecting from a holographic optical element, even though a person of skill in the art will appreciate that non-reflective effects, such as diffractive effects, may contribute to the redirection. A person of skill in the art will appreciate that the redirection (e.g., reflection, refraction, diffraction, or combination thereof) accomplished by a hologram may be of varying completeness depending on the specific details of the hologram. In other words, the holographic optical elements described herein may redirect all or only a portion (e.g., 25%, 50%, 75%, or otherwise) of the laser light incident thereon depending on the design of the corresponding hologram(s) and the characteristics of the photopolymer film into which the hologram(s) is/are encoded. Upon reflection of visible light 421, first hologram 431 may advantageously converge the visible light 421 to a relatively small exit pupil substantially at the eye 490 of the user for the purpose of providing a clear and focused image with a wide field of view. The exit pupil of visible light 421 may have a diameter that at least approximately matches or is less than the diameter of the pupil of the eye 490. Upon reflection of the infrared light 422, second hologram 432 may converge, diverge, or collimate the infrared light 422 to a relatively large exit pupil substantially at the eye 490 of the user for the purpose of illuminating the entire area of eye 490 and tracking all eye positions/orientations/motions within that illuminated area. The exit pupil of infrared light 422 may have a diameter that at least approximately matches or is greater than the diameter of the entire eye 490.

Depending on the specific implementation, holographic optical element 430 may comprise a single volume of material (e.g., photopolymer) that encodes, includes, or generally carries both first hologram 431 and second hologram 432, or alternatively holographic optical element 430 may comprise at least two distinct layers of material (e.g., photopolymer) that are laminated or generally layered together, a first layer of material carrying first hologram 431 and a second layer of material carrying second hologram 432.

Figure 5:
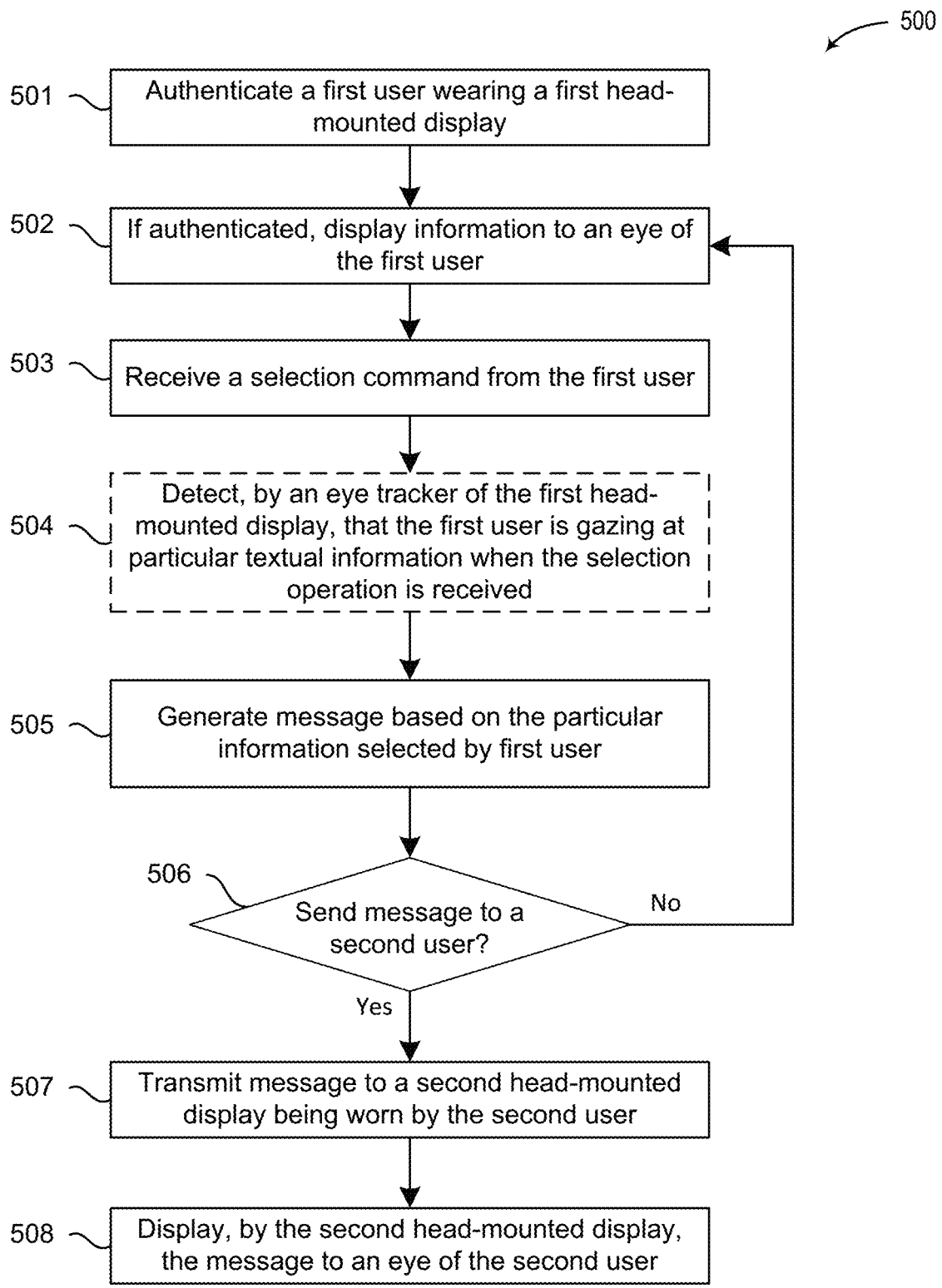
FIG. 5 is a logic flow-diagram showing an exemplary method of aspects of an implementation of generating a private message using information displayed to an eye of a first user wearing a first head-mounted display and transmitting the message to a second head-mounted display of a second user for display to an eye of the second user.

FIG. 5 is a logic flow-diagram showing a method 500 of generating a private message using information displayed to a first user wearing a first head-mounted display and transmitting the message to second head-mounted display of a second user for display to the second user. The method 500 may be implemented on or by a system (e.g., substantially similar to systems 100, 200, 300, and/or 400 from FIGS. 1-4, respectively) that comprises a first HMD (e.g., 304) and a second HMD (e.g., 306), one or more of which has a corresponding portable interface device (e.g., 320) that is physically separate from the corresponding HMD (e.g., 304).

The method 500 begins, at 501, where the first HMD (304) authenticates the first user (301). In some implementations, the first user (301) may be authenticated prior to displaying information (115) to the first user (301) or prior to each message generation. In other implementations, the first user (301) may be authenticated once the first HMD (304) is worn by the first user (301) (e.g., in response to the detected distance by the proximity sensor being within the threshold distance) and not re-authenticated unless the first user (301) removes the first HMD (304). In yet other implementations, authentication may be performed prior to sending the message (e.g., prior to 507 described below) or prior to receiving a message.

Such user authentication may include a password or passcode that is entered via a similar interface as described herein for generating a message; a facial scan and authentication on a smart phone that transmits a positive authentication (i.e., the user is allowed to use the HMD) or negative authentication (i.e., the user is not allowed to use the HMD) to the HMD; iris recognition or retina feature detection (e.g., as described above regarding measuring similarities between test biometric identification data and reference biometric identification data obtained via an eye-tracker (e.g., 117) of the first HMD (304)).

In other implementations, authentication may be implemented via user-unique "eye swipe patterns." For example, the eye-tracker (117) may be used to record and detect unique movement of the first user's (301) eye as the user moves the eye with respect to a previously entered "eye swipe pattern." For example, the "eye swipe pattern" may include the user's eye following a specific sequence of gaze state, such as gaze far left, faze far down, roll eye counter-clockwise to gaze far up, blink, gaze straight down. In a setup stage, the user may be presented with instructions to move their eyes in in a unique pattern that will be used as their unique "eye swipe pattern" (reference eye swipe pattern), which can be compared to subsequent eye movement when trying to authenticate the first user.

If the first user (301) is authorized to view the information (115) first HMD (304), at 502, displays information (115) to an eye of a first user (301) wearing the first HMD (304). As described above, aspects of various implementations include the first HMD (304) displaying the information (115) to one or both eyes of the first user (301), such as, but not limited to, projecting the information (115) onto the user's eyes using a scanning laser projector. Such information (115) may include a virtual keyboard, icons, words, phrases, predefined messages, etc.

As the information (115) is being displayed to the eye of the first user (301), an input interface (116) of the first HMD (304), at 503, receives a selection command from the first user (301). As discussed above, the user can input such selection commands via actuators on the first HMD (304), via a graphical interface on a portable user device (e.g., an app executing on a smart phone 314), or via a wireless portable interface device (320). For example, the wireless portable interface device (320) generates a wireless signal (250) in response to the first user (301) activating an actuator (121) on the wireless portable interface device (320). The wireless signal (250) is transmitted to or broadcast and received by the receiver (116) of the first HMD (304).

In some optional implementations at 504, an eye tracker (e.g., 117) of the first HMD (304) detects that the first user (301) is gazing at particular information when the selection operation is received from the portable interface device (320). The first HMD (304) utilizes information obtained or measured by the eye tracker (117) to determine where in the information the user is gazing. Based on the gazing position and the known location of a plurality of different particular information objects, the particular information that the user is gazing at is determined. For example, the information (115) may be a virtual keyboard. The first HMD (304) determines that, based on the gazing position and the known position of the letter "T" on the virtual keyboard, the user is gazing at the letter "T" when the selection operation is received from the wireless portable interface device (320).

In response to the user input command or in response to detecting the particular information, the first HMD (304), at 505, generates or updates a message based on the particular information associated with the first user's input. In some implementations, the message may be displayed to the first user (301) along with the information (115).

As the first user (301) is generating the message, the first HMD (304), at 506, determines if the message is complete and is to be sent to a second user (e.g., 302). This determination may be based on the first user (301) selecting a "send button" in the information (115) being displayed. In some aspects of various implementations, a particular signal or sequence of signals received from the portable interface device (320) may be used to determine that the first user (301) has completed composing the message and the message can now be sent to the second user (302). For example, the portable interface device (320) may include one actuator (e.g., 121) for performing a "select" operation and a second actuator for performing a "message completion" operation. If the message is not complete, the method 500 loops to 502 to continue displaying the information (115) and receiving, at 503, additional selection operations from the first user (301). If the message is complete and ready to be sent to the second user (302), the method 500 continues at 507.

At 507, a transmitter (118) of the first HMD (304) transmits the message to the second HMD (306) being worn by the second user (302). In some aspects, the transmitter (118) transmits the message directly to the second HMD (306), such as via Bluetooth® or other short-range communication protocols. In other aspects, the transmitter (118) transmits the message to a messaging service server (e.g., 330) via a cellular network (e.g., towers 342), Wi-Fi, or other networking protocols, which can forward the message to the second HMD (306) via a cellular network (e.g., towers 340) or other communication protocols. In yet other aspects of some implementations, the transmitter (118) transmits the message to a smart phone or other portable communication device of the first user (301), which can then forward the message to the second HMD (306) via short-range communication, cellular networks, or other communication networks, either directly, via other portable communication devices, or via the messaging service server. In this way, the first HMD (304) and/or the second HMD (306) can send or receive network communications for one another directly, via one or more smart phones or other portable electronic devices, or messaging service, or a combination thereof.

At 508, the second HMD (306) displays the message to an eye of the second user (302). The second HMD (306) may display the message to the second user (302) similar to what is described herein and at 502 of method 500.

Figure 6:
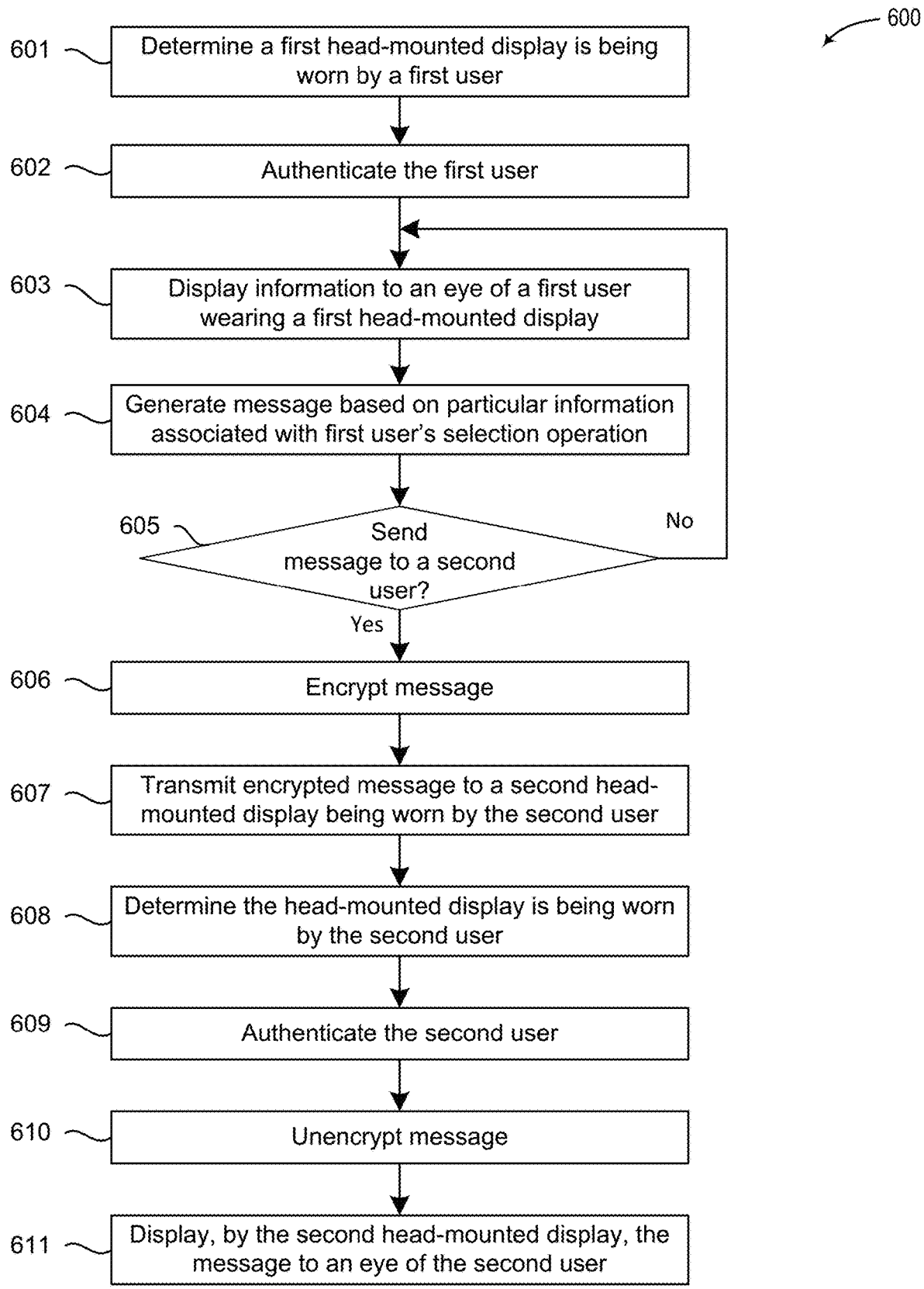
FIG. 6 is a logic flow-diagram showing an exemplary method of aspects of another implementation of generating a private message using information displayed to an eye of the first user wearing a first head-mounted display and transmitting the message to a second head-mounted display of a second user for display to an eye of the second user.

FIG. 6 is a logic flow-diagram showing a method 600 of other aspects of an implementation of generating a private message using information displayed to a first user wearing a first head-mounted display and transmitting the message to a second head-mounted display of a second user for display to the second user. The method 600 is similar to the method 500 in FIG. 5, and method 600 may be implemented on by a system (e.g., substantially similar to systems 100, 200, 300, and/or 400 from FIGS. 1-4, respectively) that comprises a first HMD (e.g., 304) and a second HMD (e.g., 306), one or more of which has a corresponding portable interface device (e.g., 320) that is physically separate from the corresponding HMD (e.g., 304).

The method 600 begins, at 601, where the first HMD (304) determines that the first user (301) is wearing the first HMD (304). Aspects of some implementations include determining that the first user (301) is wearing the first HMD (304) by an optical proximity sensor positioned on the first HMD (304) and directed towards the first user's (301) face and configured to detect the presence of the first user (301) as wearing the first HMD (304) (e.g., the proximity sensor detects an object (e.g., the user's face) within a threshold distance from the first HMD (304)). Such proximity sensor can also be configured to detect when the first user (301) removes the first HMD (304) from their face. If the first user (301) removes the first HMD (304), then the first user's authentication may be reset and the first user (301) would need to be re-authenticated prior to generating another message.

At 602, the first HMD (304) authenticates the first user (301), similar to what is described above at 501 of method 500 in FIG. 5.

At 603, in response to a positive authentication (i.e., the first user can access and use the first HMD), the first HMD (304) displays information (115) on an eye of a first user (301) wearing the first HMD (304), similar to what is described above at 502 of method 500 in FIG. 5.

At 604, the first HMD (304) generates a message based on particular information associated with the first user's gaze when the selection operation is received from the portable interface device (320), similar to what is described above at 503, 504, and 505 of method 500 in FIG. 5. In some implementations, determining the first user's gaze may be optional, similar to what is described above for method 500 in FIG. 5.

At 605, the first HMD (304) determines if the message is complete and is to be sent to a second user (302), similar to 506 of method 500 in FIG. 5. If the message is not complete, the method 600 loops to further display the information (115) at 603 and generate, at 604, the message from particular information associated with the first user's selection operations or commands. If the message is complete and ready to be sent to the second user (302), the method 600 continues at 606.

At 606, the first HMD (304) encrypts the message using any known encryption protocol (e.g., RSA, etc.).

At 607, a transmitter (118) of the first HMD (304) transmits the encrypted message to the second HMD (306) being worn by the second user (302), similar to 507 of method 500 in FIG. 5.

At 608, the second HMD (306) determines that the second HMD (306) is being worn by the second user (302), similar to 601 described above.

At 609, the second HMD (306) authenticates the second user (302), similar to 602 described above. In some implementations, the second user (302) may be authenticated when the second HMD (306) is first worn by the second user (302). In other implementations, the second user (302) may be authenticated prior to receiving a message or prior to accessing a message that has been received.

In response to a positive authentication of the second user (302), the second HMD (306), at 610, unencrypts the message using known encryption protocols compatible with the protocols used to encrypt the message.

At 611, a display (111) of the second HMD (306) displays the message on an eye of the second user (302), similar to 508 of method 500 in FIG. 5.

The second user (302) can respond to the received message by employing the interface and systems described herein for employing eye tracking of the second user (302) based on information being displayed to the second user (302).

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), one or more communicative link(s) through one or more wireless communication protocol(s), and/or optical pathways (e.g., optical fiber), and exemplary communicative couplings include, but are not limited to, electrical couplings, magnetic couplings, wireless couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other portable and/or wearable electronic devices, not necessarily the exemplary wearable electronic devices generally described above.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable storage medium for use by or in connection with any processor-related system or method. In the context of this disclosure, a memory is a processor-readable storage medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable storage medium" can be any element that can store the program associated with logic and/or information for use by or in connection with the instruction execution system, apparatus, and/or device. The processor-readable storage medium can be, for example, but is not limited to, an electronic, magnetic, optical, electromagnetic, infrared, or semiconductor system, apparatus or device. More specific examples (a non-exhaustive list) of the computer readable storage medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system that enables communication between head-mounted display devices, the system comprising:
a first head-mounted display device including:
a first display device to display information to at least one eye of a first user when the first head-mounted display device is worn on a head of the first user, wherein the information is discernable to the at least one eye of the first user at a distance and orientation specified for the first user;
an input interface to receive a command from the first user;
at least one processor communicatively coupled to the first display device and the input interface;
at least one non-transitory processor-readable storage medium communicatively coupled to the at least one processor, wherein the at least one non-transitory processor-readable storage medium stores processor-executable instructions that, when executed by the at least one processor, cause the at least one processor to:
prior to the first display device displaying the information to the at least one eye of the first user, authenticate that the first user is authorized to view the information;
in response to the authentication indicating that the first user is authorized to view the information, cause the first display device to display the information to the at least one eye of the first user at the specified distance and orientation for the first user;

receive at least one command from the first user via the input interface of the first head-mounted display device to select at least a portion of the information; and in response to receiving the at least one command from the first user, generate a message with the selected portion of the information; and a wireless transmitter communicatively coupled to the at least one processor to wirelessly transmit the message to a second head-mounted display device of a second user.

2. The system of claim 1, wherein the wireless transmitter is communicatively coupled to the at least one processor to wirelessly transmit the message to the second head-mounted display device of the second user via an intermediary computing device.

3. The system of claim 1, wherein the processor-executable instructions stored by the at least one non-transitory processor-readable storage medium, when executed by the at least one processor, cause the at least one processor to:
authenticate the first user after the message is generated; and cause the wireless transmitter to transmit the message to the second head-mounted display device in response to the first user being authorized to transmit the message.

4. The system of claim 1, wherein the processor-executable instructions stored by the at least one non-transitory processor-readable storage medium, when executed by the at least one processor, cause the at least one processor to:
cause the first display device to display a virtual keyboard to the at least one eye of the first user;
receive at least one virtual key selection command from the first user via the input interface of the first head-mounted display device;
generate a passcode to include each virtual key on the virtual keyboard when the first user inputs the at least one virtual key selection command; and
perform the authentication based on a comparison of the generated passcode and a reference code for the first user.

5. The system of claim 1, wherein the first head-mounted display device further includes an eye-tracker to detect movement of the at least one eye of the first user, and wherein the processor-executable instructions stored by the at least one non-transitory processor-readable storage medium, when executed by the at least one processor, cause the at least one processor to:
detect a plurality of movements of the at least one eye of the first user via the eye-tracker of the first head-mounted display device; and
perform the authentication based on a comparison of the detected plurality of movements and a reference movement pattern for the first user.

6. The system of claim 1, wherein the processor-executable instructions stored by the at least one non-transitory processor-readable storage medium, when executed by the at least one processor, cause the at least one processor to:
cause the first display device to project infrared light onto the at least one eye of the first user in a scanned pattern;
detect eye-scan data based on reflections of the infrared light off the at least one eye of the first user during the scanned pattern;
generate test biometric identification data based on the detected eye-scan data; and
perform the authentication based on a similarity comparison between the test biometric identification data and reference biometric identification data for the first user.

7. The system of claim 6, wherein to generate the test biometric identification data the processor-executable instructions, when executed by the at least one processor, cause the at least one processor to generate a test iris image based on the detected eye-scan data, and wherein the performance of the authentication includes a comparison between the test iris image to a reference iris image of the first user.

8. The system of claim 1, wherein the first head-mounted display device further includes a proximity sensor to sense a distance between the first head-mounted display device and the head of the first user, and wherein the processor-executable instructions stored by the at least one non-transitory processor-readable storage medium, when executed by the at least one processor, cause the at least one processor to initiate the authentication in response to the distance between the first head-mounted display device and the head of the first user being below a threshold distance.

9. The system of claim 1, wherein the input interface includes:
a wireless portable interface device with a form factor to be carried by the first user that is physically separate from the first head-mounted display device, wherein the wireless portable interface device includes at least one actuator that, when activated by the first user, causes the wireless portable interface device to wirelessly transmit a signal; and
wherein the input interface of the first head-mounted display device further includes a wireless receiver to wirelessly receive signals from the wireless portable interface device as the at least one command from the first user.

10. The system of claim 1, wherein the processor-executable instructions stored by the at least one non-transitory processor-readable storage medium, when executed by the at least one processor, cause the at least one processor to:
encrypt the message prior to transmitting the message from the first head-mounted display to the second head-mounted display device.

11. A method of generating and transmitting private messages between a first user wearing a first head-mounted display device and a second user wearing a second head-mounted display device, comprising:
prior to displaying message information to the first user, authenticating, by the first head-mounted display, that the first user is authorized to view the message information;
in response to the authentication indicating that the user is authorized to view the message information, displaying, by the first head-mounted display device, the message information to at least one eye of the first user at a discernable distance and orientation for the first user;
receiving, by a receiver of the first head-mounted display, at least one input signal from the first user indicative of a user selection action by the first user to select at least a portion of the message information;
generating, by the first head-mounted display, a message based on the selected portion of the message information; and
transmitting, from the first head-mounted display to a second head-mounted display, the message to be displayed to at least one eye of the second user by the second head-mounted device.

12. The method of claim 11, further comprising:
encrypting, by the first head-mounted display, the message prior to transmitting the message from the first head-mounted display to the second head-mounted display; and
unencrypting, by the second head-mounted display, the message prior to displaying the message onto the at least one eye of the second user.

13. The method of claim 11, wherein authenticating the first user includes:
displaying a virtual keyboard to the at least one eye of the first user;
receiving at least one virtual key selection operation from the first user via the receiver of the first head-mounted display device;
generating a passcode to include each virtual key on the virtual keyboard selected by the first user; and
performing the authentication based on a comparison between the generated passcode and a reference code for the first user.

14. The method of claim 11, wherein authenticating the first user includes:
detecting, by an eye tracker of the first head-mounted display device, a plurality of movements of the at least one eye of the first user; and
performing the authentication based on a comparison between the detected plurality of movements and a reference movement pattern for the first user.

15. The method of claim 11, wherein authenticating the first user includes:
projecting infrared light onto the at least one eye of the first user in a scanned pattern;
detecting eye-scan data based on reflections of the infrared light off the at least one eye of the first user during the scanned pattern;
generating test biometric identification data based on the detected eye-scan data; and
performing the authentication based on a similarity comparison between the test biometric identification data and reference biometric identification data for the first user.

16. The method of claim 11, further comprising:
authenticating, by the second head-mounted display, that the second user is authorized to access the message on the second head-mounted display; and
in response to a positive authentication of the second user, displaying, by the second head-mounted display, the message to at least one eye of the second user.

17. A system that enables communication between head-mounted displays, the system comprising:
a first wireless portable interface device with a form factor to be carried by a first user, the first wireless portable interface device including at least one actuator that, when activated by the first user, causes the first wireless portable interface device to wirelessly transmit at least one signal;
a first head-mounted display device that is physically separate from the first wireless portable interface device, the first head-mounted display device including:
a first display device to display message information to at least one eye of the first user when the first head-mounted display device is worn on a head of the first user, wherein the message information is discernable to the at least one eye of the first user at a specified distance and orientation for the first user;
a first wireless receiver to wirelessly receive the at least one signal from the first wireless portable interface device;
a first processor communicatively coupled to the first display device and the first wireless receiver of the first head-mounted display device;
a first non-transitory processor-readable storage medium communicatively coupled to the first processor, wherein the first non-transitory processor-readable storage medium stores processor-executable instructions that, when executed by the first processor, cause the first processor to:
prior to the first display device displaying the message information to the at least one eye of the first user, authenticate that the first user is authorized to view the information;
in response to the authentication indicating that the first user is authorized to view the message information, cause the first display device to display the message information to the at least one eye of the first user;
receive the at least one signal from the first wireless portable interface device via the first wireless receiver; and
generate a message that includes message information being displayed by the first display device when the first user activates the at least one actuator to generate the at least one signal; and
a first wireless transmitter communicatively coupled to the first processor to wirelessly transmit the message to a second head-mounted display device of a second user.

18. The system of claim 17, wherein the second head-mounted display device is physically separate from the first wireless portable interface device and the first head-mounted display device, the second head-mounted display device including:
a second wireless receiver to wirelessly receive the message; and
a second display device to display the message to at least one eye of the second user when the second head-mounted display device is worn on a head of the second user.

19. The system of claim 18, wherein the second head-mounted display device further includes:
a second processor communicatively coupled to the second wireless receiver and the second display device; and
a second non-transitory processor-readable storage medium communicatively coupled to the second processor, wherein the second non-transitory processor-readable storage medium stores processor-executable instructions that, when executed by the second processor, cause the second processor to:
authenticate the second user in response to the second user wearing the second head-mounted display device; and
in response to a positive authentication of the second user, cause the second display device to display the message to the at least one eye of the second user.

20. The system of claim 18, wherein:
the first non-transitory processor-readable storage medium further stores processor-executable instructions that, when executed by the first processor, cause the first processor to encrypt the message prior to the first wireless transmitter transmitting the message; and the second head-mounted display device further includes:
- a second processor communicatively coupled to the second wireless receiver and the second display device; and
- a second non-transitory processor-readable storage medium communicatively coupled to the second processor, wherein the second non-transitory processor-readable storage medium stores processor-executable instructions that, when executed by the second processor, cause the second processor to unencrypt the message prior to the second display device displaying the message to the at least one eye of the second user.

* * * * *